United States Patent [19]

Haggstrom

[11] Patent Number: 5,005,429

[45] Date of Patent: Apr. 9, 1991

[54] WEIGH MODULE

[75] Inventor: Rolf P. Haggstrom, East Walpole, Mass.

[73] Assignee: BLH Electronics, Inc., Canton, Mass.

[21] Appl. No.: 410,301

[22] Filed: Sep. 21, 1989

[51] Int. Cl.[5] ............................................. G01L 1/22
[52] U.S. Cl. ................................. 73/862.65; 73/862.66
[58] Field of Search ......................... 73/862.65, 862.66; 338/5; 177/211, 229

[56] References Cited

U.S. PATENT DOCUMENTS 3,554,025  1/1971  Anderson et al. ............... 73/862.66

FOREIGN PATENT DOCUMENTS 3614989  11/1987  Fed. Rep. of Germany ...... 177/211
0040930  3/1985  Japan .................................. 73/862.65

*Primary Examiner*—Charles A. Ruehl
*Attorney, Agent, or Firm*—Fish & Richardson

[57] ABSTRACT

A new strain gage transducer comprises a support bar for measuring a load force. A base supports one end of the support bar in cantilever fashion in an orientation generally orthogonal to the direction in which the load force is to be applied. A load portion receives the load force and transmits it to the support bar, forcing it to flex. The amount of flexure is measured thereby allowing the amount of the load force to be determined. The base support includes a receiving portion mount on the base.

11 Claims, 1 Drawing Sheet

WEIGH MODULE

FIELD OF THE INVENTION

The invention relates generally to the field of strain gages, and more particularly to fixtures for use in determining weights of objects.

BACKGROUND OF THE INVENTION

Strain gages are used with a number of devices to measure forces, such as the amount of tension exerted on an object, or the weight of an object. Typically, a strain gage comprises a transducer upon which an electrical bridge circuit is mounted. The transducer deforms as strain is applied. The bridge circuit includes a plurality of arms, each of which includes an electrical resistor which is also deformed in conformity with the deformation of the transducer. The deformation of the resistors causes variations in resistance in one or more of the arms of the electrical bridge, effectively unbalancing it. Electronic circuitry measures the amount of the unbalancing of the bridge and determines therefrom the degree of deformation of the structure. From the information relating to the degree of deformation, and from the transducer's materials and design, the amount of the strain being applied to the strain gage can be determined in a conventional manner. The structure of the transducer may be varied based on the particular application in which the strain gage is to be used.

SUMMARY OF THE INVENTION

The invention provides a new and improved strain gage transducer useful in determining the weight of an object.

In brief summary, the new strain gage transducer comprises a strain gage support bar that supports a strain gage to measure a load force. A base supports an end of the strain gage support bar in cantilever fashion in an orientation generally orthogonal to the direction in which the load force is to be applied. The load force is applied to a load portion which transmits the load force to the support bar and forces it to flex, the strain gage effectively measuring the degree of flexure of the support bar to facilitate measurement of the load force.

In one embodiment, both the base and the load portion include an interior surface defining a passageway dimensioned to receive opposing ends of the support bar, and the strain gage is affixed to the support bar therebetween. When a load is applied to the load portion, it causes the portion of the support bar between the base and the load portion to flex, thereby deforming the strain gage.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF A PREFERRED EMBODIMENT

Figure 1:
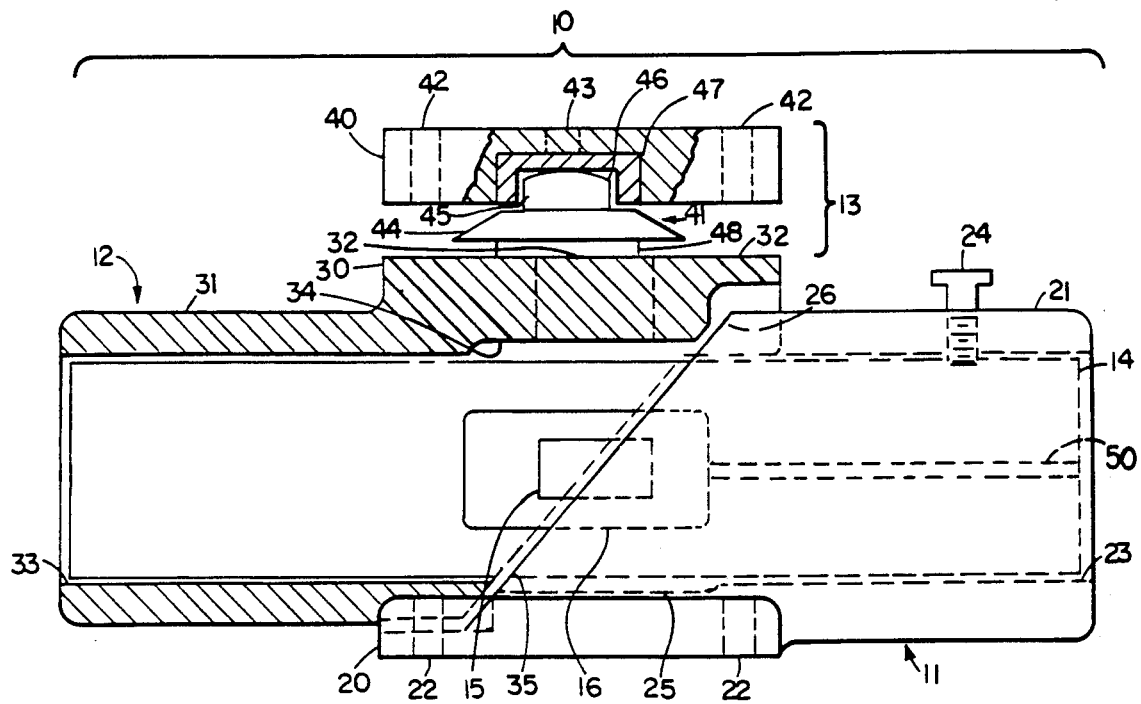
FIG. 1 depicts a side elevational view, partially in section, of a strain gage constructed in accordance with the invention.
Figure 2:
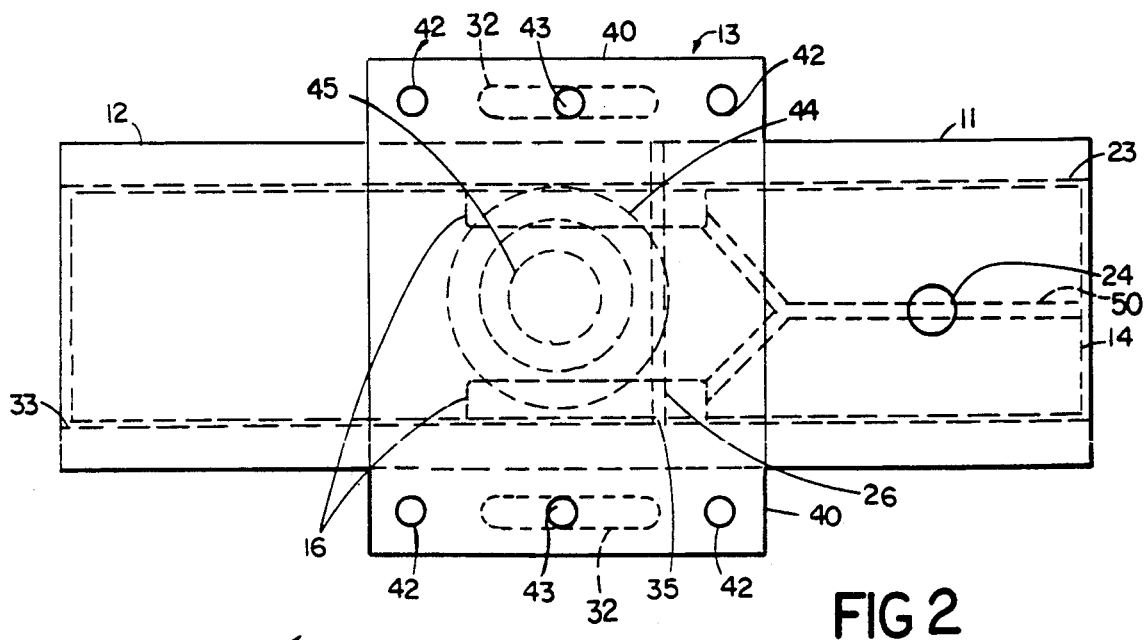
FIG. 2 depicts a top view of the strain gage depicted in FIG. 1.

FIG. 1 depicts a side elevational view, partially in section, of a strain gage transducer 10 constructed in accordance with the invention, and FIG. 2 depicts a top view of the transducer 10 depicted in FIG. 1. With reference to both FIGS. 1 and 2, the transducer 10 includes a base member 11 and a load member 12, the latter receiving a load supplied on a load support 13. The base member 11 and load member 12 are affixed to opposing ends of a strain gage support bar 14 which has strain gage 15 mounted on planar surfaces formed in recesses 16 in its opposing sides. The load member 12 is effectively supported only by the one end of the strain gage support bar 14. The opposite end of the support bar 14 is held in place by member 11.

During use, the base member 11 is situated on a stationary support (not shown), which, depending on the application, may be the earth. A load (also not shown) is placed on the load support 13. The load causes the load member 12 to apply a force to the left end (as shown in FIG. 1) of the support bar 14 that forces it to move in a downward direction, thereby causes the portion of the support bar 14 between the base member 11 and load member 12 to flex. The amount by which the load causes the support bar 14 to flex reflects the amount of force applied by the load. The amount of flexure of the support bar 14 is measured by the strain gage 15 mounted on the support bar 14 from which measurement conventional external electronic circuitry (not shown determines the amount of the load applied to load support 13.

The base member 11 includes a foot portion 20 which supports a bar support portion 21, shown generally above and to the right of the foot portion 20 in FIG. 1. The foot portion 20 is generally rectangular, when seen from above, and it extends out beyond the sides of the bar support portion 21. It includes a plurality of mounting holes 22 which receive threaded fasteners to permit the transducer 10 to be mounted to the stationary support. The bar support portion 21 includes an interior surface 23 which is generally configured and dimensioned to receive one end of the support bar 14. A layer of cement (not shown) and setscrew 24 threaded through an opening in the top of support portion 21 hold the support bar 14 tightly fixed during operation. The support bar 14 extends outside the support portion 21, as will hereinafter be explained in more detail.

The structure of the load member 12 is similar to that of the base 11. The load member 12 includes an upper load support portion 30 and a support bar receiving portion 31. The upper load support portion 30 is generally rectangular, and it includes a plurality of elongated slots 32. The bar receiving portion 31 includes an interior surface 33 which is configured and dimensioned to receive the free end of the support bar 14, that is, the end of the support bar extending out from the support portion 21 of base member 11. The free end of the support bar 14 is affixed to the bar receiving portion 31 by a layer of cement (not shown). An opening (not shown) may be provided for a setscrew (also not shown) to affix the load member 12 to the support bar 14 during operation.

The interior surfaces 23 and 33 of opposing ends of the respective portions 21 and 31 of the base 11 and load member 12 are configured and dimensioned to hold opposing end portions of the support bar 14. Between the opposing ends of portions 21 and 31, the interior surface 23 and 33 forms recesses, identified by reference numeral 25 in base 11 and reference numeral 34 in load member 12, which facilitate flexure of the support bar 14 in the region in which it supports the strain gage 15. The base 11 effectively supports the support bar 14 in cantilever fashion, with the bar being free of vertical support (by the base 11) to the left of the recess 25, as shown in FIG. 1. Under load, the ends affixed to the portions 21 and 31 remain parallel, and the support bar 14 flexes between the right edge of recess 25 and the left edge of recess 34, with the amount of flexure reflecting the applied load.

As shown in FIG. 1, the base 11, and particularly the bar support portion 21 has an angled endwall 26. Similarly, the load member 12 has a bar support portion 31 which has an angled endwall 35. In the embodiment depicted in FIG. 1, the endwalls 26 and 35 are shown as being disposed adjacent to each other. The two endwalls 26, 35 do not, however, come in contact with one another during use. Instead, the base 11, load member 12 and support bar 14 are structured to maintain a separation between the endwalls 26 and 35 to ensure that a load applied to the load member 12 is directed to support bar 14.

The particular disposition of the respective angles sidewalls 26 and 35, as shown in FIG. 1, is not required for operation of the transducer 10, but it provides several advantages. In particular, the acute angle of sidewall 26, for example, permits the sides of the bar support portion 21 to extend far to the left on the lower base 20, maximizing the support provided by the lower base 20. Furthermore, the acute angle of the sidewall provides a structure that has a lower stress, particularly at the portion of the base 11 near the lower end of the sidewall 26, than if the sidewall 26 were vertically disposed. Similarly, the acute angle of sidewall 35 provides a lower stress near the upper end of sidewall 35 than if it were vertically disposed.

The load support 13 includes an upper support pad 40, which is of substantially the same horizontal size and shape as the upper load support portion 30. A support 41 receives the upper support pad 40 elevated over the load member 12. The upper support pad 40 includes four mounting holes 42 which may accommodate a threaded fastener (not shown) to affix the upper support pad to the load (also not shown).

In addition, the upper support pad 40 includes two load mounting holes 43 which receive fasteners (not shown) which extend from the upper support pad 40 through the slots 32 in the upper support pad 40. The slots 32 in the embodiment depicted in FIGS. 1 and 2 accommodate alignment variations as the transducer 10 is being mounted under a load. In addition, if the transducer 10 is being used in an application in which the underside surface of the load may be forced to move horizontally over the upper surface of the upper support pad 40, the slots can accommodate the movement. In some applications, such as in supporting a large outdoor tank for liquids, several transducers may be provided at various locations under the container. Every so often, the container may expand slightly due to thermal changes, resulting in a shift of the underside of the container relative to the upper surface of the upper support pad 40, and the slots can permit the transducer 10 to accommodate the shift.

The support 41 includes a lower member 44 formed essentially as a frustum of a cone with a horizontal upper surface, and a knob 45 extending upwardly therefrom. The lower surface of the member 44 has a relatively large surface area so as to distribute a load force received from the upper support pad 40 over a relatively large area of the upper load support portion 30.

The knob 45 of support 41 has a rounded upper surface which fits into a recess 46 in the underside of the upper support pad 40. The knob 45 is rounded to accommodate possible tilting of the upper support pad 40 when a load is applied. The interior of the recess 46 may be coated with a resilient coating to lessen likelihood wear of both the knob 45 and the interior surface of the recess 46 at the points where they contact.

The lower member 44 rests on a thin resilient bearing 48 of low friction material which operates to permit shifting of the member 44 over the upper surface of load applying member 12. Suitable material for the bearing 48 includes Garlock DU Flat Strip material, sold by Garlock Bearings, Inc.

The support bar 14 is preferably cylindrical, which minimizes the likelihood of stress points developing in the bar when the transducer 10 is in use. The support bar 14 includes a Y-shaped passageway 50 extending from its right end to the recesses 16 which receives wires to connect strain gage to the electronic equipment to facilitate determination of the deflection of the support bar 14 under load. The interior surfaces 23 and 33 in the bar support portions 21 and 31, respectively, also preferably define generally cylindrical passageways to minimize likelihood of stress points developing around support bar 14.

In use, the transducer 10 is assembled by applying a layer of cement to the interior surface 23 of the bar support portion. Thereafter one end of the support bar 14 is inserted into the bar support portion 21 and affixed thereto by the setscrew 24. A layer of cement is also applied to the interior surface 33 of load member 12, and the load member 12 is then mounted on the other end of the strain gage support bar 14, which the load member 12 being oriented so that the angled sidewalls 26 and 35 are proximate but not touching. In this configuration, the lower base support portion 20 and the upper load support portion 30 are disposed on opposing sides around the strain gage support bar 14. The load support 13, including the bearing 48, support 41, and upper support pad 40 are then placed on the upper load support portion 30 and generally centered on its upper surface, and threaded fasteners may be inserted through holes 43 and slots 32 to attach the upper support pad to the load member 12. Threaded fasteners (not shown) may then be inserted through the holes 22 in the lower base support portion 20, and into a stationary support (not shown) to fasten the transducer 10 to the stationary support. Thereafter, a load is placed on the upper support pad 40, and fastened thereto by threaded fasteners inserted through the holes 42. The strain gage 15 may then be connected to the electronic equipment (not shown) to monitor deflection of the support bar 14 by the load.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A strain gage transducer for measuring a load force comprising:
   a support bar;
   a base for supporting a first end of said support bar in an orientation generally orthogonal to the load force to be measured, said base including a sidewall disposed at an acute angle to the direction of application of the load force, said support bar extending from said sidewall;
   said base including a first support bar receiving portion, said first support bar receiving portion including an interior surface defining a passageway dimensioned to receive said first end of said support bar, and
   a load portion for transmitting the load force to a second end of said support bar extending from said sidewall to force said support bar to flex, said strain gage transducer effectively measuring the degree of flexure of said support bar thereby measuring the load force,
   said load portion including:
      an upper load receiving portion mounted on a second support bar receiving portion for receiving the load force and transmitting it to said second support bar receiving portion of said load portion;
      an upper load support portion mounted on said second support bar receiving portion, and
      a load support associated with said upper load receiving portion for transmitting the load force to said load portion which, in turn, causes said support bar to flex, the degree of flexure being measured by a transducer attached to said support bar;
      a load pad associated with said load support receiving the load force; and
      a support means associated with said load support for supporting said load pad above said upper load support portion, and for transmitting the load force received by said load pad to said upper load support portion;
      said load pad having an upper surface which receives the load force and a lower surface having a centrally-located recess, said support means contacting said load pad in said recess.

2. A strain gate transducer as defined in claim 1 in which the interior surface of said first support bar receiving portion defines a recess which permits said support bar to flex downwardly toward said base when the load force is applied.

3. A strain gage transducer as defined in claim 1 in which said first support bar receiving portion includes said sidewall disposed at an acute angle with respect to the direction of the load force.

4. A strain gage transducer as defined in claim 1 in which said first support bar receiving portion substantially surrounds said first end of said support bar.

5. A strain gage transducer as defined in claim 1 wherein said support bar receiving portion of said load portion substantially surrounds the end of said support bar received thereby.

6. A strain gage transducer as defined in claim 1 wherein said second support bar receiving portion of said load portion includes a sidewall extending over said base at an acute angle, said sidewall disposed proximate said sidewall of said base.

7. A strain gage transducer as defined in claim 1 in which said support means comprises a knob with a generally rounded surface which contacts said load pad.

8. A strain gage transducer as defined in claim 1 in which said support means comprises:
   an upper contact portion which contacts said load pad in a relatively small area; and
   a lower support portion disposed between said upper contact portion and said upper load support portion, said lower support portion contacting said upper load support portion in a relatively large area thereby distributing the load force over said large area.

9. A strain gage transducer as defined in claim 8 in which said upper contact portion includes an upwardly extending, generally cylindrical member with a rounded upper surface, and said lower support portion is shaped as the frustum of a cone.

10. A strain gage transducer for measuring a load force comprising:
    an elongated support bar;
    a base support comprising:
       a base portion;
       a base support bar receiving portion mounted on said base portion, which includes an interior surface defining a passageway dimensioned to receive a first end of said support bar, said passageway receiving said first end of said support bar thereby supporting said support bar but permitting a second and opposite end of said support bar to flex downwardly toward said base portion where the load force is applied;
    a load portion comprising:
       a support bar receiving portion including an interior surface defining a passageway dimensioned to receive said second end of said support bar;
       an upper load support portion mounted on said support bar receiving portion for said load portion;
       a recess provided in the interior surface of said support bar receiving portion which permits said support bar to flex downwardly toward said base portion when the load force is applied;
       a load support including a load pad which has an upper surface for receiving the load force and a lower surface having a centrally-located attachment means, and further including a support means in contact with said attachment means for transmitting the load force received by said load pad to said upper load support portion which causes said second end of said support bar to flex into said recess, the degree of flexure being measured by a measurement means whereby the amount of the load force can be determined.

11. A strain gage transducer for measuring a load force comprising:
    an elongated support bar having a substantially cylindrical outer surface;
    a base support comprising:
       a base portion;
       a base support bar receiving portion mounted on said base portion including an interior surface defining a passageway dimensioned to receive a first end of said support bar, said passageway receiving and supporting said first end of said support bar but permitting the opposite second end of said support bar to flex toward said base portion when the load force is applied, said base support bar receiving portion including a sidewall extending over said base portion and extending at an acute angle from said base portion;

a load portion comprising:
  a load support bar receiving portion including an interior surface defining a passageway dimensioned to receive said second end of said support bar, said load support bar receiving portion including an angled sidewall which is disposed proximate to said angles sidewall of said base support bar receiving portion;
  an upper load support portion mounted on said load application portion support bar receiving portion;
a load support comprising:
  a load pad having an upper surface for receiving the load force and a lower surface having a centrally-located attachment means;
  a support means in contact with said attachment means for transmitting the load force received by said load pad to said upper load support portion whereby the load force is transmitted to said load support bar receiving portion which causes said support bar to flex, the degree of flexure being measured so that the amount of the load force can be determined.

* * * * *